United States Patent [19]
Genise

[11] Patent Number: 6,126,569
[45] Date of Patent: Oct. 3, 2000

[54] STARTING AND DRIVELINE SHOCK PROTECTION CONTROL METHOD AND SYSTEM

[75] Inventor: Thomas A. Genise, Dearborn, Mich.

[73] Assignee: Eaton Corporation, Cleveland, Ohio

[21] Appl. No.: 09/356,757

[22] Filed: Jul. 19, 1999

[51] Int. Cl.[7] .................................................. B60K 41/18
[52] U.S. Cl. ............................................................ 477/91
[58] Field of Search .................................... 477/90, 91

[56] References Cited

U.S. PATENT DOCUMENTS

| | | | |
|---|---|---|---|
| 4,361,060 | 11/1982 | Smyth | 74/866 |
| 4,595,986 | 6/1986 | Daubenspeck et al. | 364/424.1 |
| 4,648,290 | 3/1987 | Dunkley et al. | 477/78 |
| 4,807,132 | 2/1989 | Arai et al. | 477/91 |
| 4,850,236 | 7/1989 | Braun | 74/337 |
| 4,947,331 | 8/1990 | Speranza | 364/424.1 |
| 5,172,609 | 12/1992 | Nitz et al. | 74/866 |
| 5,219,391 | 6/1993 | Edelen et al. | 74/335 |
| 5,272,939 | 12/1993 | Markyvech | 74/866 |
| 5,335,566 | 8/1994 | Genise | 74/335 |
| 5,389,053 | 2/1995 | Steeby et al. | 477/123 |
| 5,390,561 | 2/1995 | Stine | 74/331 |
| 5,409,432 | 4/1995 | Steeby | 477/71 |
| 5,425,689 | 6/1995 | Genise | 477/120 |
| 5,435,212 | 7/1995 | Menig | 74/745 |
| 5,479,345 | 12/1995 | Amsallen | 364/424.1 |
| 5,487,004 | 1/1996 | Amsallen | 364/424.1 |
| 5,489,247 | 2/1996 | Markyvech | 477/120 |
| 5,490,063 | 2/1996 | Genise | 364/424.1 |
| 5,509,867 | 4/1996 | Genise | 477/120 |
| 5,529,548 | 6/1996 | Mack | 477/84 |
| 5,533,946 | 7/1996 | Markyvech | 477/78 |
| 5,582,069 | 12/1996 | Genise | 74/335 |
| 5,582,558 | 12/1996 | Palmeri et al. | 477/109 |
| 5,595,550 | 1/1997 | Jarvis et al. | 477/91 |
| 5,620,392 | 4/1997 | Genise | 477/120 |
| 5,655,407 | 8/1997 | Dresden et al. | 74/336 |
| 5,713,445 | 2/1998 | Davis et al. | 192/35 |
| 5,737,978 | 4/1998 | Stine | 74/606 |
| 5,743,143 | 4/1998 | Carpenter et al. | 74/335 |
| 5,766,111 | 6/1998 | Steeby et al. | 477/124 |

*Primary Examiner*—Dirk Wright
*Attorney, Agent, or Firm*—Howard D. Gordon

[57] ABSTRACT

A method/system for controlling an automated mechanical transmission system (10) utilized on a vehicle. To protect from driveline damage due to clutch "popping," upon sensing vehicle launch conditions (clutch (16) not engaged, transmission (14) engaged ($THL > REF_{THL}$ and $OS < REF_{SPEED}$)), engine speed is limited to idle speed plus a preset value ($ES < (ES_{IDLE} + RPM)$).

20 Claims, 2 Drawing Sheets

STARTING AND DRIVELINE SHOCK PROTECTION CONTROL METHOD AND SYSTEM

BACKGROUND OF THE INVENTION

1. Field of the Invention

The present invention relates to a control method/system for controlling vehicle starting (i. e., vehicle launch) in an at least partially automated mechanical transmission system. In particular, the present invention relates to the control of starting in a vehicular automated mechanical transmission system wherein the system senses conditions indicative of a vehicle launch, such as very low vehicle ground speed and a less-than-fully engaged master clutch, and limits maximum engine speed until substantially full clutch engagement is sensed.

2. Description of the Prior Art

Fully or partially automated mechanical transmission systems for vehicular use are known in the prior art, as may be seen by reference to U.S. Pat. Nos. 4,361,060; 4,648,290; 4,722,248; 4,850,236; 5,389,053; 5,487,004; 5,435,212 and 5,755,639.

Controls for automated mechanical transmission systems, especially wherein dynamic shifting is accomplished while maintaining the master clutch engaged and/or wherein the master clutch is manually controlled and is disengaged only for starting or stopping the vehicle, are known in the prior art, as may be seen by reference to U.S. Pat. Nos. 4,576,065; 4,916,979; 5,335,566; 5,425,689; 5,272,939; 5,479,345; 5,533,946; 5,582,069; 5,582,558; 5,620,392; 5,489,247; 5,490,063 and 5,509,867, the disclosures of which are incorporated herein by reference.

The prior art systems, especially the prior art systems having manually controlled clutch pedals used for starting, provided the opportunity for abuse of the driveline if the driver, when starting, fully depressed the throttle and then quickly released the clutch. Such "popping" of the clutch could cause undue wear and/or damage to the various components of the vehicle driveline.

SUMMARY OF THE INVENTION

The control of the present invention provides a control for a vehicular automated mechanical transmission system which will sense conditions indicative of vehicle launch and will protect the vehicle from shocks until the master clutch is fully or substantially fully engaged.

The foregoing is accomplished in a system wherein operating conditions are sensed/determined and engine speed (ES) controlled by sensing vehicle start conditions (i.e., if the vehicle ground speed is low (OS<REF), the transmission is engaged in a gear ratio, the throttle is depressed (THL>REF), and if the master clutch is not fully engaged, then engine speed is governed to a maximum speed equal to about 200–300 RPM above idle (ES<$ES_{IDLE}$+300 RPM)).

The above control logic will minimize large driveline shocks caused by rapidly engaging ("popping") the master clutch at high engine speeds and also provides a handy engine speed governor for starting on grades. For example, when starting the vehicle on a grade, or in other highly loaded situations, the driver could fully depress the accelerator and then slowly let out the clutch. When the clutch becomes fully locked up, the engine speed control is ended and the vehicle accelerates normally. This allows the driver to use a higher engine speed to get started in a difficult condition while retaining the benefits of the electronic speed limit control. In a hill-start condition, the driver could also use the trailer brakes, or another hill-start aid, to hold the vehicle from rolling backward during the start.

Accordingly, an improved start control for automated mechanical transmissions is provided which will minimize driveline shocks due to clutch "popping" and will provide good start-on-grade performance.

This and other objects and advantages of the present invention will become apparent from a reading of the following description of the preferred embodiment taken in connection with the attached drawings.

DESCRIPTION OF THE PREFERRED EMBODIMENT

Figure 1:
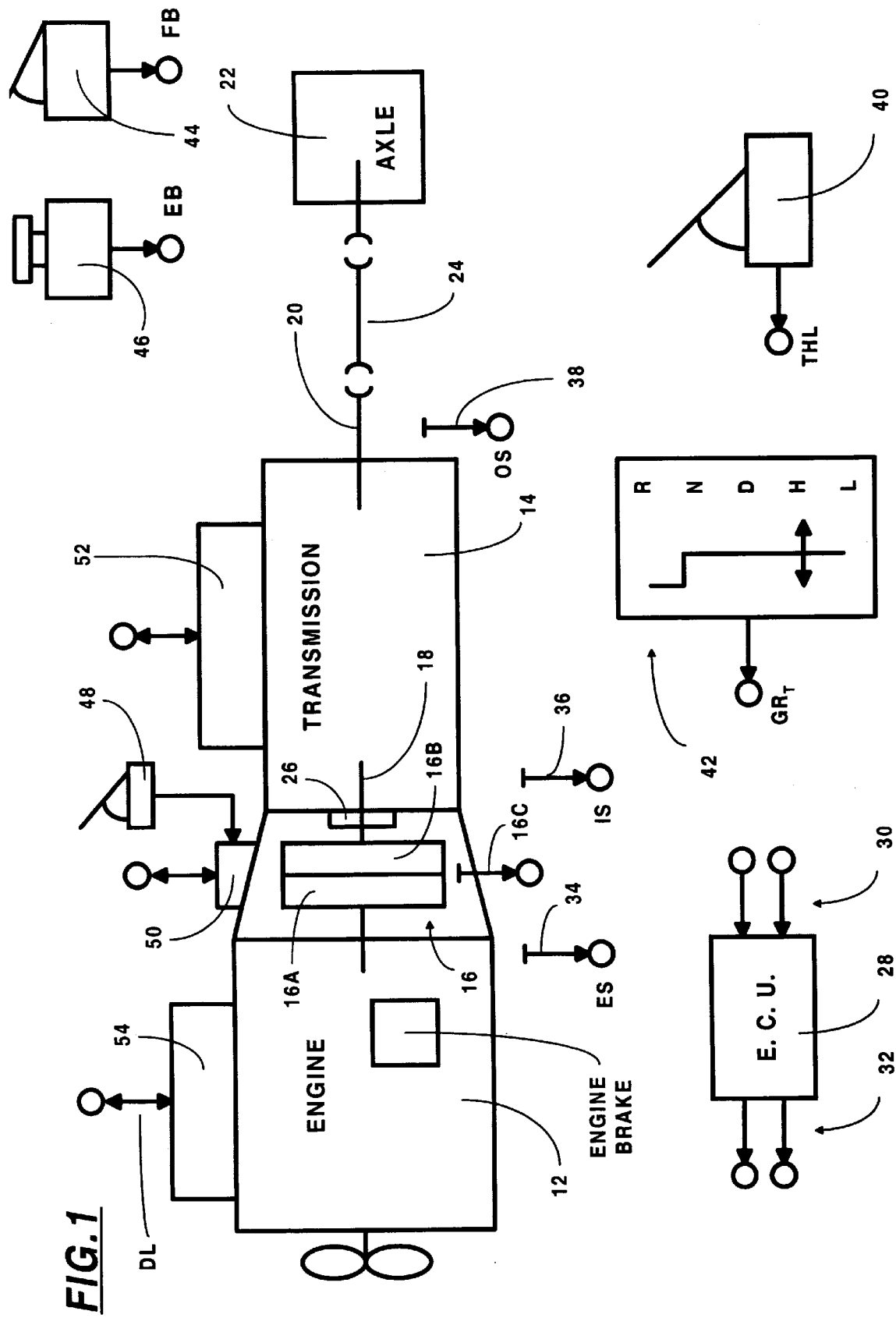
FIG. 1 is a schematic illustration, in block diagram format, of an automated mechanical transmission system utilizing the control of the present invention.

An at least partially automated mechanical transmission system intended for vehicular use is schematically illustrated in FIG. 1. The automated transmission system 10 includes a fuel-controlled engine 12 (such as a well-known diesel engine or the like), a multiple-speed, change-gear transmission 14, and a non-positive coupling 16 (such as a friction master clutch) drivingly interposed between the engine and the input shaft 18 of the transmission. The transmission 14 may be of the compound type comprising a main transmission section connected in series with a splitter- and/or range-type auxiliary section. Transmissions of this type, especially as used with heavy-duty vehicles, typically have 6, 7, 8, 9, 10, 12, 13, 16 or 18 forward speeds. Examples of such transmissions may be seen by reference to U.S. Pat. Nos. 5,390,561 and 5,737,978, the disclosures of which are incorporated herein by reference.

A transmission output shaft 20 extends outwardly from the transmission 14 and is drivingly connected with the vehicle drive axles 22, usually by means of a prop shaft 24. The illustrated master friction clutch 16 includes a driving portion 16A connected to the engine crankshaft/flywheel and a driven portion 16B coupled to the transmission input shaft 18 and adapted to frictionally engage the driving portion 16A. See U.S. Pat. Nos. 5,634,541; 5,450,934 and 5,908,100. An upshift brake 26 (also known as an input shaft brake or inertia brake) may be used for selectively decelerating the rotational speed of the input shaft 18 for more rapid upshifting, as is well known. Input shaft or upshift brakes are known in the prior art, as may be seen by reference to U.S. Pat. Nos. 5,655,407 and 5,713,445.

A microprocessor-based electronic control unit (or ECU) 28 is provided for receiving input signals 30 and for processing same in accordance with predetermined logic rules to issue command output signals 32 to various system actuators and the like. Microprocessor-based controllers of this type are well known, and an example thereof may be seen by reference to U.S. Pat. No. 4,595,986.

System 10 includes a rotational speed sensor 34 for sensing rotational speed of the engine and providing an output signal (ES) indicative thereof, a rotational speed sensor 36 for sensing the rotational speed of the input shaft 16 and providing an output signal (IS) indicative thereof, and a rotational speed sensor 38 for sensing the rotational speed of the output shaft 20 and providing an output signal (OS) indicative thereof. A sensor 40 may be provided for sensing the displacement of the throttle pedal and providing an output signal (THL) indicative thereof. A shift control console 42 may be provided for allowing the operator to select an operating mode of the transmission system and for providing an output signal (GRT) indicative thereof.

As is known, if the clutch is engaged, the rotational speed of the engine may be determined from the speed of the input shaft and/or the speed of the output shaft and the engaged transmission ratio (ES=IS=OS*GR).

System 10 also may include sensors 44 and 46 for sensing operation of the vehicle foot brake (also called service brakes) and engine brakes, respectively, and for providing signals FB and EB, respectively, indicative thereof.

The master clutch 16 may be controlled by a clutch pedal 48 or by a clutch actuator 50 responding to output signals from the ECU 28. Alternatively, an actuator responsive to control output signals may be provided, which may be overridden by operation of the manual clutch pedal. In the preferred embodiment, the clutch is manually controlled and used only to launch and stop the vehicle (see U.S. Pat. Nos. 4,850,236; 5,272,939 and 5,425,689). The transmission 14 may include a transmission actuator 52, which responds to output signals from the ECU 28 and/or which sends input signals to the ECU 28 indicative of the selected position thereof. Shift mechanisms of this type, often of the so-called X-Y shifter type, are known in the prior art, as may be seen by reference to U.S. Pat. Nos. 5,305,240 and 5,219,391. Actuator 52 may shift the main and/or auxiliary section of transmission 14. The engaged and disengaged (i.e., "not engaged") condition of clutch 16 may be sensed by a position sensor 16C or may be determined by comparing the speeds of the engine (ES) and the input shaft (IS).

Fueling of the engine is preferably controlled by an electronic engine controller 54, which accepts command signals from and/or provides input signals to the ECU 28. Preferably, the engine controller 54 will communicate with an industry standard data link DL which conforms to well-known industry protocols such as SAE J1922, SAE 1939 and/or ISO 11898. The ECU 28 may be incorporated within the engine controller 54.

As is known, for automated shifting embodiments, the ECU 28 must determine when upshifts and downshifts are required and if a single or skip shift is desirable (see U.S. Pat. Nos. 4,361,060; 4,576,065; 4,916,979 and 4,947,331).

Manual truck transmissions with manual starting clutches provided the opportunity for abuse of the driveline by the driver. For example, the driver has the ability (when starting the vehicle from rest) to fully depress the accelerator and then quickly releasing the clutch. This can be very damaging to the various components of the driveline. Therefore, driveline component manufacturers have to design their components to withstand this abuse, creating overdesigned, expensive components.

Automated mechanical transmissions with a manual clutch can prevent much of this abuse with the control algorithm of the present invention, which does not allow maximum engine speeds when engaging the clutch during starts.

When the vehicle is in start-from-rest condition (i.e., vehicle speed slow, in gear, clutch disengaged, throttle depressed, etc.), engine speed is limited (via J1939 commands or similar data bus) to a small margin (200–300 RPM) above idle speed. For a typical diesel engine governed to a maximum speed of about 2100 RPM, idle speed is about 600 RPM. This accomplishes two benefits: (1) it prevents large driveline shocks caused from rapidly engaging ("popping") the clutch at high engine speeds, and (2) it provides a second, handy engine speed governor for starting on grades. For example, when starting the vehicle on a grade, or other highly loaded situations, the driver could fully depress the accelerator and then slowly let out the clutch. When the clutch becomes fully locked up, the engine speed control is ended and the vehicle accelerates normally. This allows the driver to use a higher engine speed to get started in a difficult condition while retaining the benefits of the electronic speed limit control. In a hill-start condition, the driver could also use the trailer brakes, or another hill-start aid, to hold the vehicle from rolling backward during the start.

By way of example, if the vehicle is stopped or traveling very slowly (less than 3–5 MPH), the throttle pedal is displaced (THL>20–50% of full displacement), the transmission is engaged in a ratio and the clutch is not fully engaged, then the engine fuel control will be commanded to fuel the engine so that engine speed does not exceed idle speed ($ES_{IDLE}$) plus a predetermined RPM (about 300 RPM), i.e., $ES<ES_{IDLE}+300$ RPM. Preferably, the engine will be controlled over an electronic data link conforming to SAE J1939 or a similar protocol.

Figure 2:
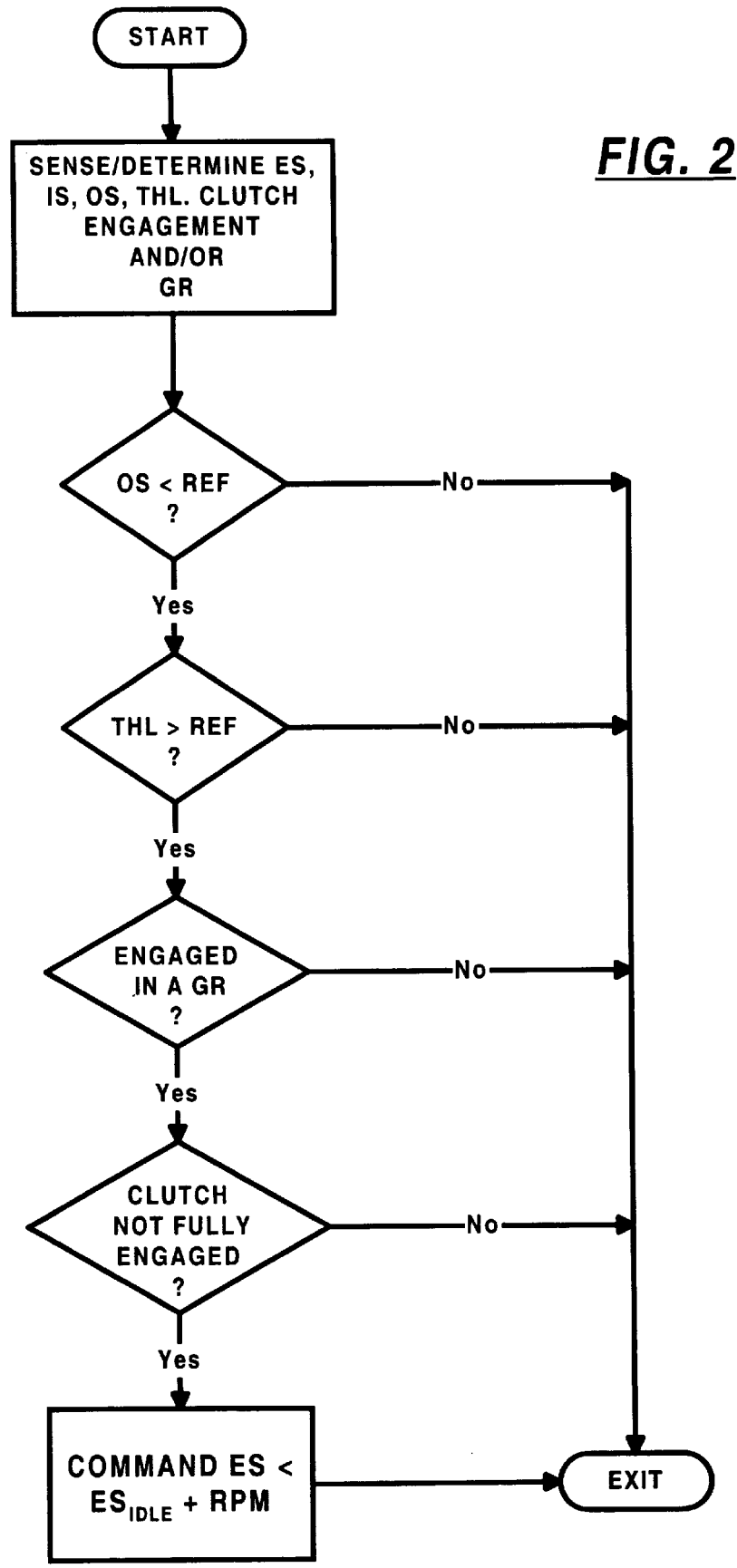
FIG. 2 is a schematic illustration, in flow chart format, of the control of the present invention.

The control of the present invention is shown in flow chart format in FIG. 2. The control logic of the present invention will prevent or minimize driveline shock caused by clutch "popping," allowing less expensive driveline components to be utilized. The control logic of the present invention also enhances vehicle launch while on a grade.

Accordingly, it may be seen that an improved control system/method for controlling starting in an at least partially automated mechanical transmission system is provided.

Although the present invention has been described with a certain degree of particularity, it is understood that the description of the preferred embodiment is by way of example only and that numerous changes to form and detail are possible without departing from the spirit and scope of the invention as hereinafter claimed.

I claim:

1. A method for controlling a vehicular automated transmission system (10) for a vehicle comprising a fuel-controlled engine (12) having a known idle speed ($ES_{IDLE}$), an engine fuel control device (54), a multiple-speed transmission (14) coupled to the engine by a master friction clutch (16), and a controller (28) for receiving input signals (30) including one or more of signals indicative of engine speed (ES), engaged gear ratio (GR), operator throttle setting (THL), clutch engagement and vehicle speed (OS), and to process said input signals in accordance with with logic rules to issue command output signals (32) to transmission system actuators including said fuel control device, said method characterized by:

(1) determining if the transmission is engaged in a gear ratio;

(2) determining the engaged or not engaged condition of said master friction clutch;

(3) comparing the value of a signal (OS) indicative of vehicle speed and a speed reference value ($REF_{SPEED}$); and (4) if (i) the transmission is engaged in a gear ratio, (ii) the master friction clutch is not engaged, and (iii) the value of the signal indicative of vehicle speed is less than said speed reference value ($OS<REF_{SPEED}$), then commanding fueling of the engine to cause engine speed to be less than the sum of said idle speed and a predetermined rotational speed value ($ES<(ES_{IDLE}+RPM)$).

2. The method of claim 1 wherein commanding fueling of the engine to cause engine speed to be less than the sum of said idle speed and a predetermined rotational speed value ($ES<(ES_{IDLE}+RPM)$) further requires that (iv) throttle position exceed a throttle reference value ($THL>REF_{THL}$).

3. The method of claim 1 wherein said master clutch is manually engaged and not engaged.

4. The method of claim 2 wherein said master clutch is manually engaged and not engaged.

5. The method of claim 1 wherein said speed reference ($REF_{SPEED}$) varies with engaged ratio of the transmission.

6. The method of claim 1 wherein said speed reference ($REF_{SPEED}$) value corresponds to about 3–5 MPH.

7. The method of claim 1 wherein said throttle reference value ($REF_{THL}$) is about 20–50% of full throttle displacement.

8. The method of claim 1 wherein said rotational speed value (RPM) is about 200–300 RPM.

9. The method of claim 1 wherein said system (10) includes a position sensor (16C) for sensing the engaged and not engaged conditions of said master clutch.

10. The method of claim 1 wherein sensing the engaged or not engaged conditions of said master clutch comprises comparing transmission input shaft speed (IS) to engine speed (ES).

11. A control system for controlling a vehicular automated mechanical transmission system (10) for a vehicle comprising a fuel-controlled engine (12) having a known idle speed ($ES_{IDLE}$), an engine fuel control device (54), a multiple-speed mechanical transmission (14) connected to the engine by a master friction clutch (16), and a controller (28) for receiving input signals (30) including one or more of signals indicative of throttle position (THL), engine speed (ES), engaged gear ratio (GR), clutch engaged or not engaged condition, and vehicle speed (OS), and to process said input signals in accordance with with logic rules to issue command output signals (32) to transmission system actuators including said fuel control device and a transmission actuator (52) effective to shift said transmission, said control system characterized by said logic rules being effective, for (1) determining if the transmission is engaged in a gear ratio;

(2) determining the fully engaged or not fully engaged condition of said master friction clutch;

(3) comparing the value of signal (OS) indicative of vehicle speed and a speed reference value ($REF_{SPEED}$); and (4) if (i) the transmission is engaged in a gear ratio, (ii) the master friction clutch is not fully engaged, and (iii) the value of the signal indicative of vehicle speed is less than said speed reference value ($OS<REF_{SPEED}$), then commanding fueling of the engine to cause engine speed to be less than the sum of said idle speed and a predetermined rotational speed value ($ES<(ES_{IDLE}+RPM)$).

12. The system of claim 11 wherein commanding fueling of the engine to cause engine speed to be less than the sum of said idle speed and a predetermined rotational speed value ($ES<(ES_{IDLE}+RPM)$) further requires that (iv) throttle position exceed a throttle reference value ($THL>REF_{THL}$).

13. The system of claim 11 wherein said master clutch is manually engaged and not engaged.

14. The system of claim 12 wherein said master clutch is manually engaged and not engaged.

15. The system of claim 11 wherein said speed reference varies with engaged ratio of the transmission.

16. The system of claim 11 wherein said speed reference value corresponds to about 3–5 MPH.

17. The system of claim 11 wherein said throttle reference value is about 20–50% of full throttle displacement.

18. The system of claim 11 wherein said rotational speed value is about 200–300 RPM.

19. The system of claim 11 wherein said system (10) includes a position sensor (16C) for sensing the fully engaged and not fully engaged conditions of said master clutch.

20. The system of claim 11 wherein sensing the fully engaged or not fully engaged conditions of said master clutch comprises comparing transmission input shaft speed (IS) to engine speed (ES).

* * * * *